(12) United States Patent
Trimble (10) Patent No.: US 7,451,780 B1
(45) Date of Patent: Nov. 18, 2008

(54) MULTIFUNCTION VALVE FOR USE IN A HYDRAULIC COMPONENT

(75) Inventor: Robert E. Trimble, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 334 days.

(21) Appl. No.: 11/383,665

(22) Filed: May 16, 2006

Related U.S. Application Data

(60) Provisional application No. 60/681,369, filed on May 16, 2005.

(51) Int. Cl.
F16K 17/196 (2006.01)

(52) U.S. Cl. ............. 137/493.4; 137/493.2; 137/493.3; 137/493.5; 137/493.6; 417/299

(58) Field of Classification Search ... 137/493.3–493.6; 417/299; 60/489
See application file for complete search history.

(56) References Cited

U.S. PATENT DOCUMENTS

| | | | |
|---|---|---|---|
| 115,982 A | 6/1871 | Porteous | |
| 807,269 A | 12/1905 | Hildebrand | |
| 2,393,589 A | 1/1946 | Compton et al. | |
| 3,153,423 A | 10/1964 | Biello et al. | |
| 3,856,041 A | 12/1974 | Cryder et al. | |
| 4,016,903 A | 4/1977 | Akashi et al. | |
| 4,217,927 A * | 8/1980 | Morita | 137/493.3 |
| 4,300,591 A | 11/1981 | Sutton | |
| 4,328,827 A | 5/1982 | Enjolras | |
| 4,637,430 A | 1/1987 | Scheffel et al. | |
| 4,648,369 A | 3/1987 | Wannenwetsch | |
| 4,926,902 A | 5/1990 | Nakamura et al. | |
| 4,948,092 A | 8/1990 | Kasper et al. | |
| 5,002,088 A | 3/1991 | Engelhardt et al. | |
| 5,378,118 A | 1/1995 | Phillips | |
| 5,412,948 A | 5/1995 | Komura et al. | |

(Continued)

FOREIGN PATENT DOCUMENTS

GB 2112910 7/1983

(Continued)

OTHER PUBLICATIONS

Circle Seals Controls, Inc., "100 Series Check Valves 0 to 25 PSIG," brochure, Circle Seals Controls, Inc. (Corona, California), p. 1-2.

(Continued)

Primary Examiner—Stephen M Hepperle
(74) Attorney, Agent, or Firm—Neal Gerber Eisenberg LLP (57) ABSTRACT

A valve apparatus is disclosed for use in regulating the flow of fluid between a closed hydraulic loop and a fluid source in a hydraulic circuit, where the valve apparatus provides up to four different functions including a check valve, a neutral valve, a relief valve and a pressure rise rate valve. The apparatus includes a valve seat for selectively permitting fluid communication between the closed hydraulic loop and the fluid source, a sleeve member and a relief poppet in the valve seat, a relief compression spring inside the sleeve and positioned adjacent the relief poppet and the base of the slidable member, a valve guide and an accumulator piston slidably mounted within the valve guide to define an accumulator volume therein.

28 Claims, 9 Drawing Sheets

U.S. PATENT DOCUMENTS

| | | |
|---|---|---|
| 5,479,978 A | 1/1996 | Zenkich |
| 5,546,752 A | 8/1996 | Horton et al. |
| 5,632,467 A | 5/1997 | Just et al. |
| 5,687,468 A | 11/1997 | Hans et al. |
| 5,778,925 A | 7/1998 | Cooke |
| 5,950,669 A | 9/1999 | Fehlmann et al. |
| 6,045,116 A | 4/2000 | Wilke et al. |
| 6,073,444 A | 6/2000 | Horton et al. |
| 6,691,512 B1 | 2/2004 | Trimble |
| 6,719,005 B1 | 4/2004 | Trimble et al. |
| 6,935,454 B1 | 8/2005 | Hauser et al. |
| 6,968,684 B1 | 11/2005 | Hauser et al. |
| 7,028,708 B1 | 4/2006 | Langenfeld et al. |
| 2005/0028869 A1 * | 2/2005 | Roth et al. ............... 137/493.4 |
| 2006/0112993 A1 * | 6/2006 | Dong et al. ............... 137/493.6 |

FOREIGN PATENT DOCUMENTS

| | | |
|---|---|---|
| GB | 2112910 A | 7/1983 |

OTHER PUBLICATIONS

Circle Seal Controls, Inc., "200 Series 0 to 3,000 PSIG H200 Series 0 to 6,000 PSIG Check Valves," brochure.

The Lee Company, "Lee Cheks," web site information borchure, (Mar. 15, 2002).

The Lee Company, "Lee Pressure Relief Valves How to Select the right Relief Valve for your application," Article, (Mar. 15, 2002).

Kepner Products Company, "Check Valves," web site product information, (Mar. 15, 2002).

Kepner Products Company, "Relief Valves," web site product information, Kepner Products Company.

* cited by examiner

MULTIFUNCTION VALVE FOR USE IN A HYDRAULIC COMPONENT

CROSS REFERENCE

This patent application claims the benefit of U.S. Provisional Patent Application No. 60/681,369 filed on May 16, 2005, which is incorporated herein by reference in its entirety.

BACKGROUND OF THE INVENTION

This invention relates generally to the design of valves and, more particularly, to the design of a combination check valve, neutral valve, pressure rise rate valve and pressure relief valve for use in a hydraulic component such as a hydrostatic transmission or integrated hydrostatic transaxle using a closed hydraulic circuit to connect a pump and a motor.

Check valves, neutral valves, pressure rise rate valves, and pressure relief valves are known in the art. Generally, a check valve restricts fluid flow in one direction while a relief valve is used to reduce pressure spikes in the hydraulic circuit. A combination check valve and pressure relief valve is disclosed in commonly owned U.S. Pat. No. 6,691,512, the terms of which are incorporated herein by reference. A neutral valve will permit the flow of a hydraulic fluid from the closed circuit to a sump or reservoir when the component is at or near neutral to permit a wider neutral band. The use of neutral valves in a hydrostatic apparatus is disclosed in U.S. Pat. No. 4,674,287. Lastly, a pressure rise rate valve regulates how quickly pressure rises in a hydraulic system. In order to accomplish these functions in a single hydraulic component, it is generally required to use multiple valves.

SUMMARY OF THE INVENTION

A multifunction valve is provided for use in regulating the flow of fluid between a first fluid side and a second fluid side in a hydraulic component such as a hydraulic pump. The first fluid side, or closed loop hydraulic circuit, is understood to have a high pressure side and a low pressure side when the component is in operation. The second fluid side, or source of make-up fluid, may be either a sump or reservoir, or it may comprise charge fluid provided by a charge pump or the like. In essence, any source of make-up fluid for the hydraulic circuit may be considered the second fluid side or fluid source within the scope of this invention.

The valve assembly has a check valve function, permitting it to open when the pressure in the closed loop hydraulic circuit is sufficiently low to permit oil to be brought into the circuit from a sump or reservoir. The valve assembly also comprises a neutral valve function, permitting the valve to open the closed loop hydraulic circuit to the sump or reservoir when the component is at or near neutral. The valve assembly also has a pressure relief valve function permitting the valve to open when the pressure in the closed loop hydraulic circuit exceeds a desired amount that is set depending upon the application. Finally, the valve assembly in accordance with the present invention provides a pressure rise rate valve function that permits the valve to open the closed loop hydraulic circuit for a limited time to moderate pressure spikes.

The various functions of this valve apparatus are integrally formed as part of the same structure; i.e., each function is present in a single valve assembly comprised of multiple parts but all operating together in a single structure as opposed to multiple valves. While all four functions described herein are present in a valve in accordance with the preferred embodiment, it will be understood that fewer than all four functions could be present in keeping with the present invention.

In general, the relative values of the pressure set points for the valve's four functions are as follows: $P_{check} < P_{neutral} < P_{Pressure\ Rise\ Rate} < P_{Relief}$. As system pressure varies along this relative pressure continuum, the multifunction valve automatically responds, configuring its components to achieve the four functions described herein. Some overlap of these functions necessarily occurs during rapid transitions in system pressure.

A better understanding of these and other advantages, objects, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the invention, reference may be had to the following drawings in which.

DETAILED DESCRIPTION OF THE INVENTION

Turning now to the figures, wherein like reference numerals refer to like elements, there is generally illustrated in FIGS. 5-12 a multifunction valve 10.

A preferred application for valve 10 is shown in FIGS. 1-4, which depict pump assembly 40, comprising a pump housing 52 on which is mounted end cap 54 to form a sump 60 in which is located a rotable cylinder block 55. A plurality of pistons 57 are mounted in cylinder block 55 and engage moveable swash plate 58. A pump input shaft 53 extends into housing 52 to engage and drive cylinder block 55 as well as charge pump 62. It will be understood that this depicted application of valve 10 is exemplary only, and valve 10 could be used in a wide variety of applications.

End cap 54 as shown in FIGS. 1-4, 7 and 8 comprises hydraulic porting, and located therein are a pair of system ports 42 (shown here as plugged) a bypass valve 43, a case drain 45 (plugged), a charge inlet 46 (plugged) and a valve passage 34 (containing valves 10 retained by plugs 30). Charge pump 62, shown here as a gerotor style charge pump, receives fluid through charge inlet passage 47, and charged fluid is provided to the system by means of charge outlets 49 and charge gallery 48. A charge pressure relief valve 44 is also provided.

Since the construction of hydraulic pumps such as pump 40 and charge pump 62 are well known in the art, it will not be explained in greater detail here. The reader is referred to U.S. Pat. Nos. 5,555,727 and 6,494,686, the terms of which are incorporated herein by reference, for further explanation on the operation of such pumps.

Figure 1:
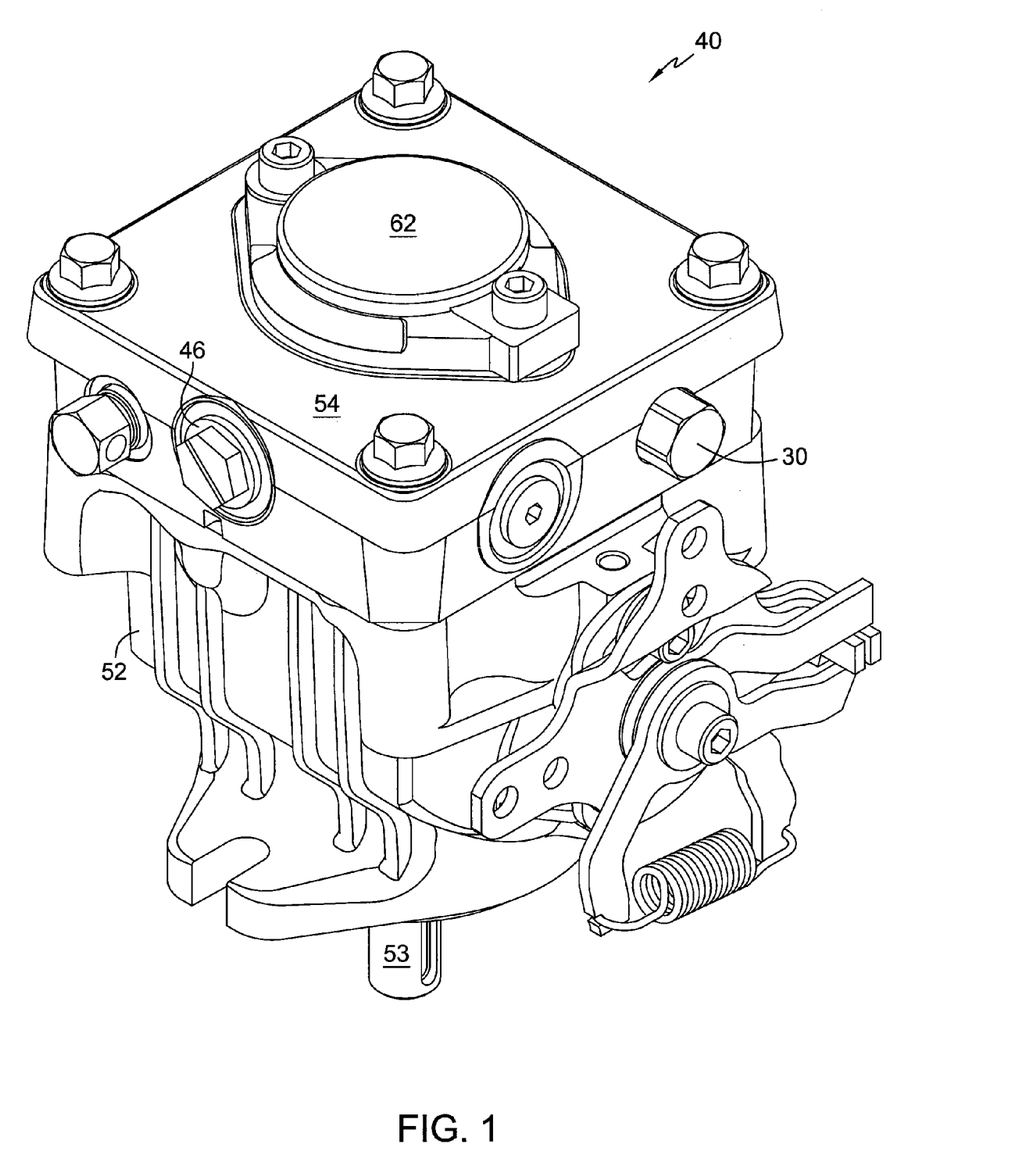
FIG. 1 is a perspective view of a hydraulic pump in which a valve assembly constructed in accordance with the present invention may be mounted.
Figure 2:
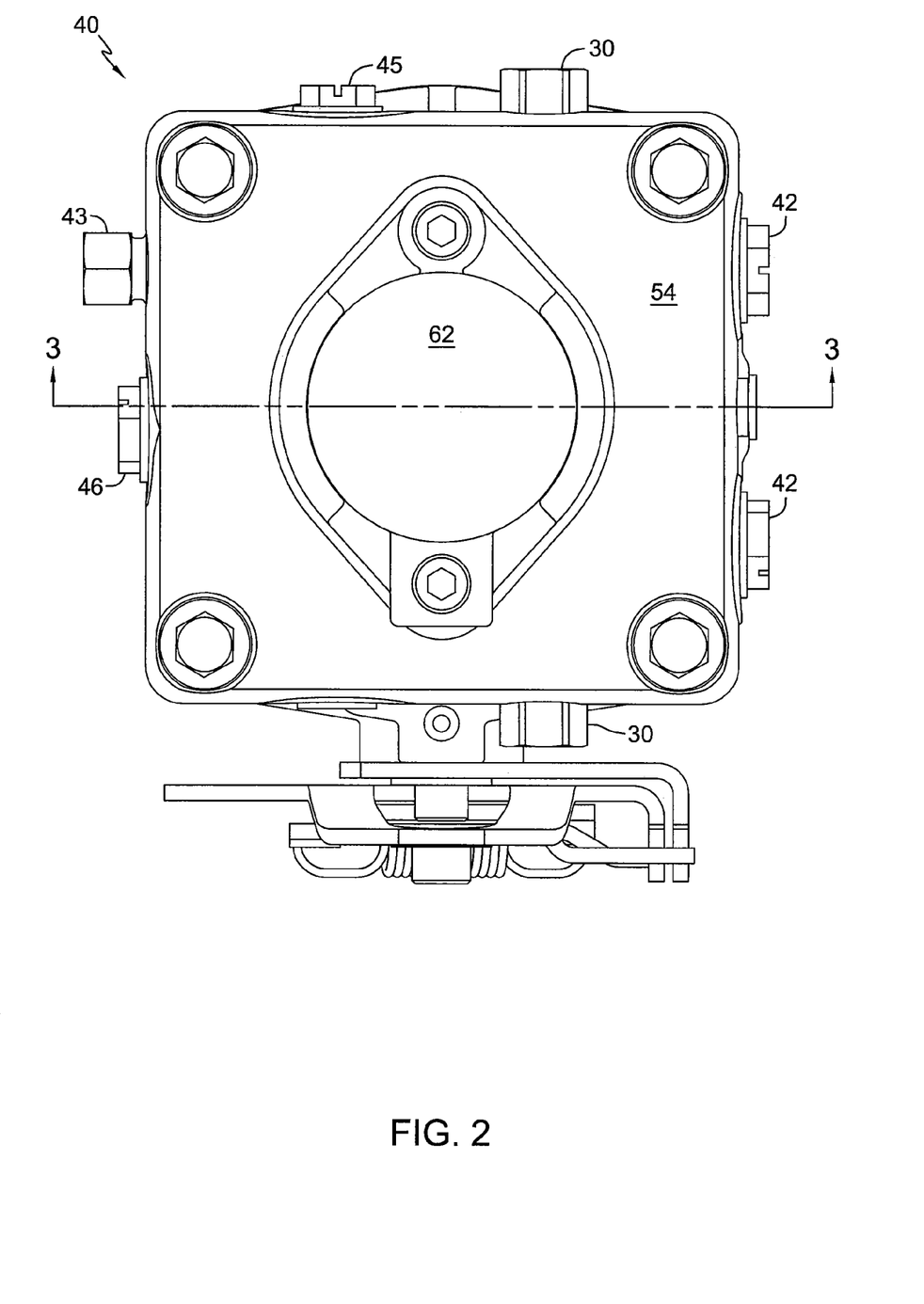
FIG. 2 is a top plan view of the pump shown in FIG. 1.
Figure 3:
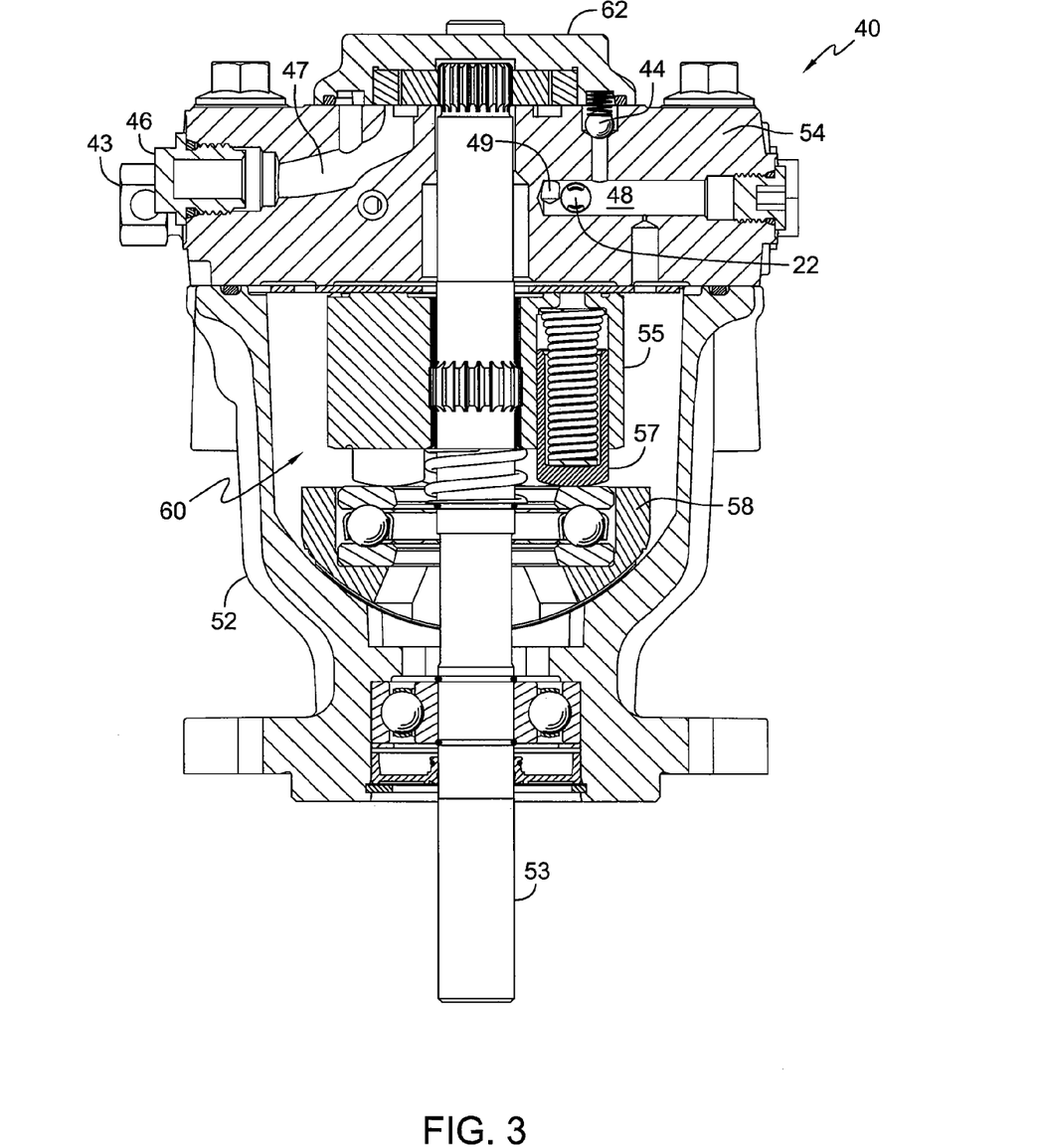
FIG. 3 is a cross-sectional, front view of the pump of FIG. 2, along line 3-3.
Figure 4:
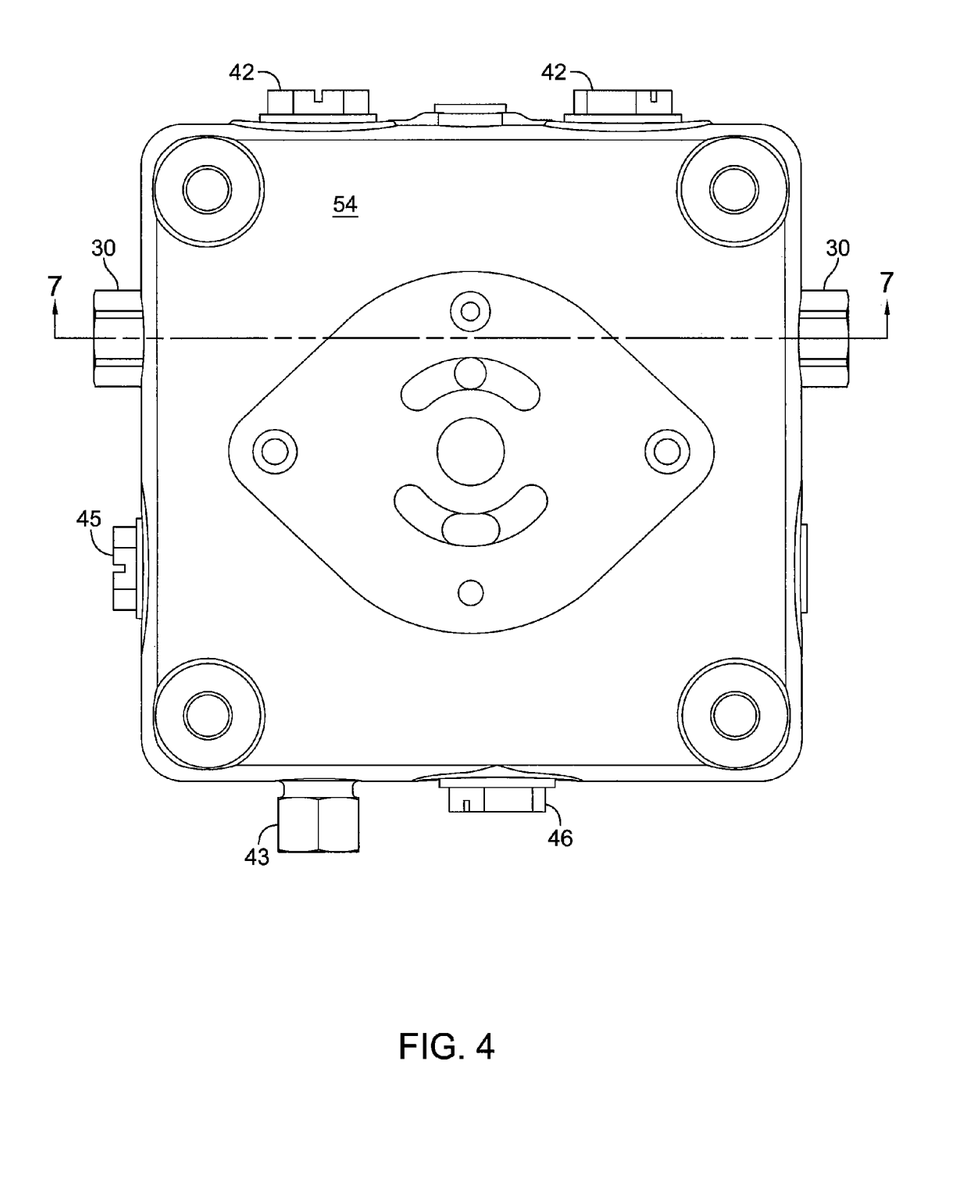
FIG. 4 is a top plan view of the end cap portion of the pump of FIG. 1, with certain of the components removed for clarity.
Figures 5, 6:
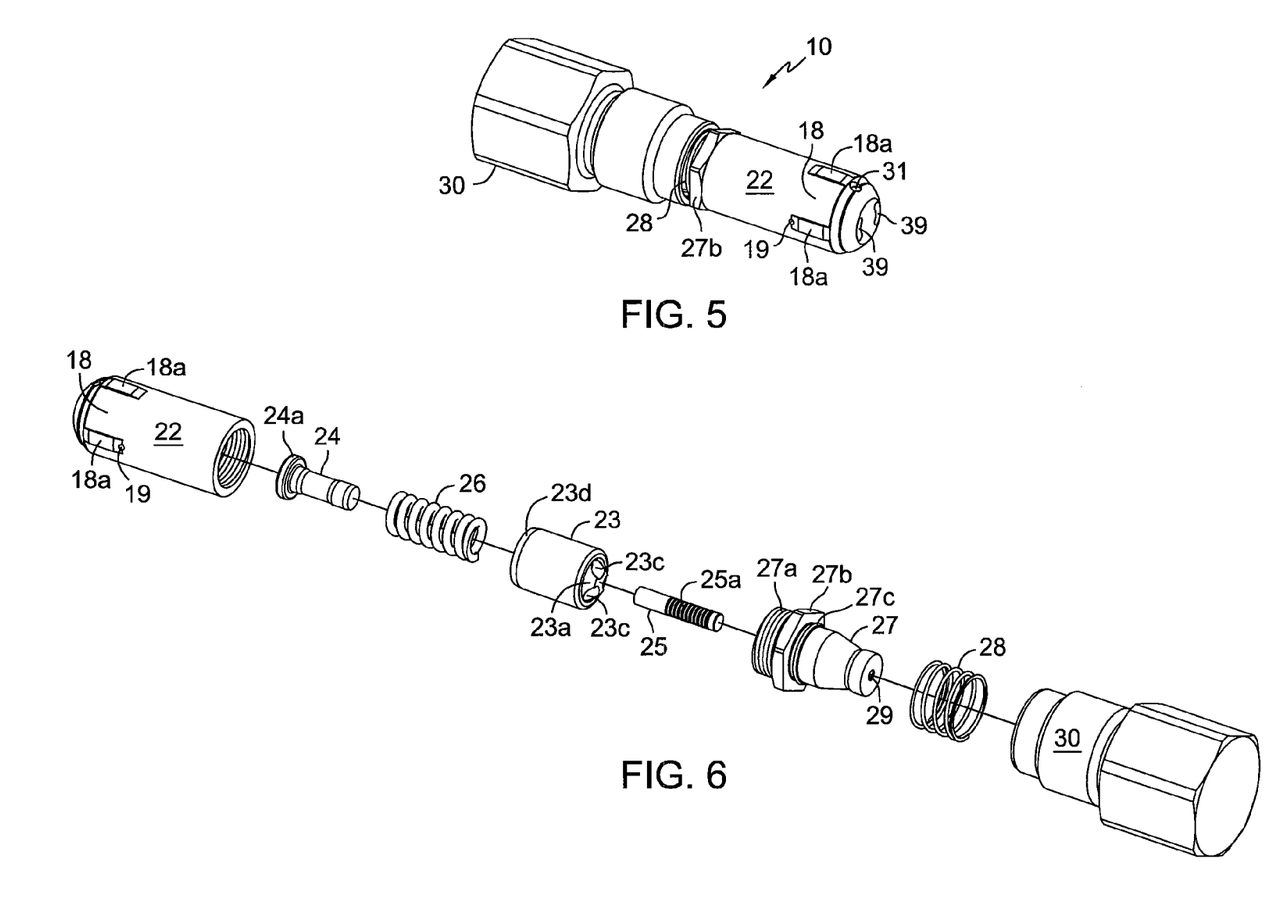
FIG. 5 is a perspective view of a multifunction valve assembly in accordance with the present invention.
FIG. 6 is an exploded view of the valve assembly shown in FIG. 5.
Figure 9:
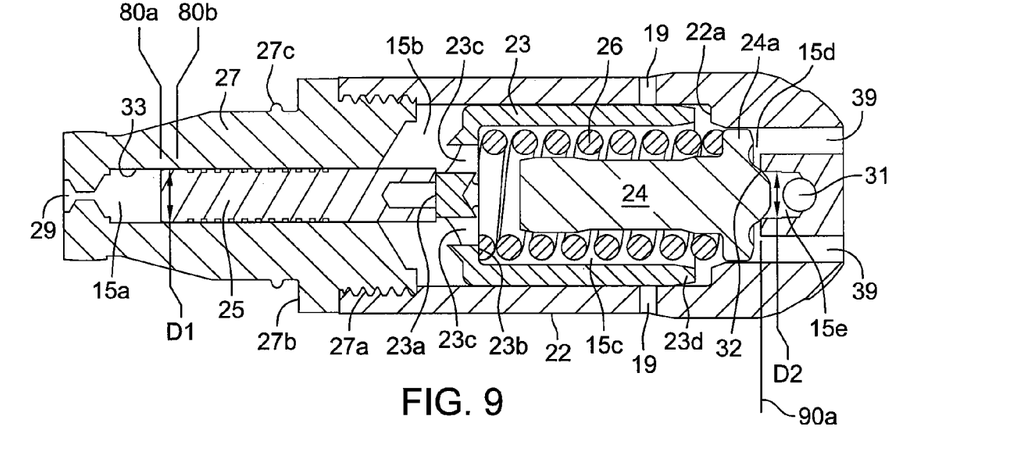
FIG. 9 is a cross-sectional view of the valve in accordance with the present invention, during nominal operating conditions, where the neutral valve portion of the valve assembly is in the closed position.

Valve assembly 10 is shown most clearly in FIGS. 5, 6, and 9. Sleeve 23 is mounted inside valve seat 22. Relief poppet 24 and relief compression spring 26 are mounted in sleeve 23, and head 24a of relief poppet 24 acts against relief compression spring 26 to move head 24a into and out of contact with inner seat surface 32 to control the flow of fluid through openings 31 formed in valve seat 22.

Sleeve 23 also has an external base 23a having openings 23c formed therein to permit fluid to pass into and out of the internal volume of sleeve 23 and also to provide a surface against which accumulator piston 25 rests. Internal to sleeve 23 is internal base portion 23b, which is contacted by spring 26. A series of ribs 25a may optionally be provided on accumulator piston 25 to disrupt any laminar flow of fluid across accumulator piston 25, lessening the bleed of fluid between the fluid sides, thereby permitting a more efficient pressure rise rate valve function.

Guide 27 comprises a threaded portion 27a that is threaded into seat 22 and an inner passage 33 in which accumulation piston 25 is slidably mounted. It will be understood that other means for attaching guides 27 to seat 22 are contemplated by the present invention, without limitation, such as welding or crimping. Check compression spring 28 is mounted about an outer surface of guide 27 and is located inside a portion of plug 30, the check compression spring retained on the valve guide by means of rib 27c for ease of assembly and installation in the end cap 54.

Figure 7:
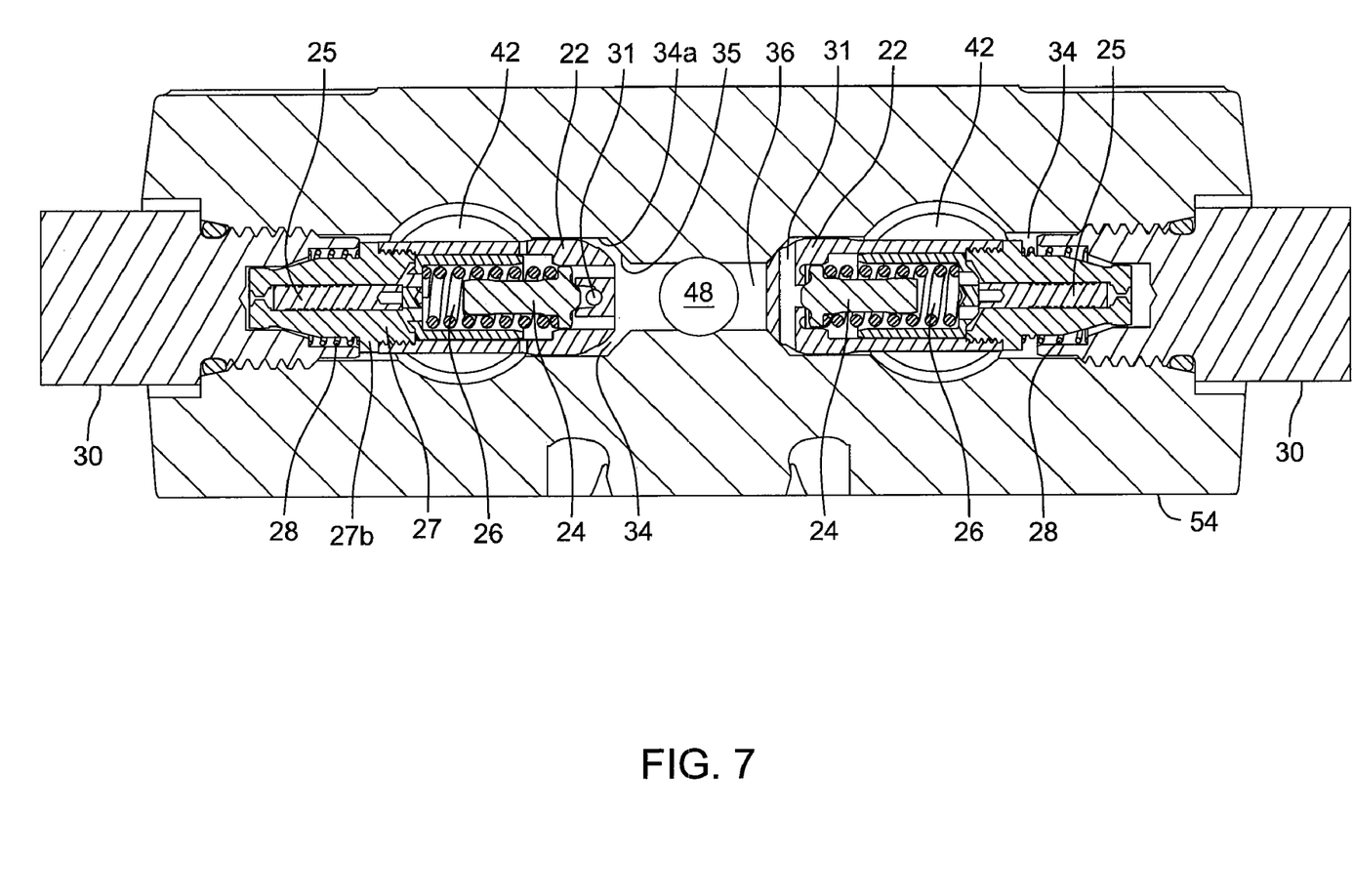
FIG. 7 is a cross-sectional view of the end cap in FIG. 4, along line 7-7, showing the check valve function of two valves, one in the open position (left) and one in the closed position (right), and where one of the valves is shown rotated 90 degrees with respect to the other valve.

The check valve feature of the present invention is shown most clearly in FIG. 7, where the valve on the left hand side of the figure has the check valve in the open position, while the valve on the right hand side has the check valve in the closed position. A valve passage 34, having inner surface 34a, is formed in end cap 54 for the mounting of both valve assemblies 10; in the preferred embodiment depicted, valve passage 34 extends through the entire end cap 54 and intersects both system ports 42. Valve passage 34 also has a narrower central passage 36, where the reduced diameter of central passage 36 compared to valve passage 34 permits the forming of two seat surfaces 35 against which the external surface of valve seat 22 may rest to close the check valve function. It will be understood that this design is not required; for example, separate port passages may be formed in end cap 54 for the two valves. It will also be understood that although the illustrated embodiment of the check valve function is described using a check compression spring, it is well known in the art that the check valve function can be accomplished without use of a check compression spring whereby a valve assembly can be oriented vertically within a hydraulic component, the check valve feature accomplished by the valve assembly working against, and being returned by, gravity and system pressure.

Check compression spring 28 acts against both head surface 27b of guide 27 and an inner surface of plug 30. This arrangement permits a first assembly consisting of guide 27 and seat 22, and the components therein, to move axially with respect to plug 30. Thus, when the pressure in charge gallery 48 exceeds the pressure in one of the system ports 42 by a predetermined amount, as determined by the spring constant of check compression spring 28, the first assembly will move toward plug 30, and off seat surface 35, permitting fluid to flow from charge gallery 48 to that valve's corresponding system port 42. A series of flow channels 18, bounded by a plurality of channel ribs 18a on the external surface of seat 22, are used to improve the flow of fluid between seat 22 and inner surface 34a of valve passage 34 when the check valve is in the open position. As will be understood, the other system port will be under high pressure at that point, so the other check valve remains closed, as shown in FIG. 7.

In describing the neutral valve, pressure rise rate valve, and relief valve functions of the present invention, reference will be made to various internal volumes formed in valve assembly 10, as denoted in FIGS. 8-12, when it is assembled. For convenience of description, these volumes are labeled as follows: volume 15a inside guide 27 and adjacent one end of accumulator piston 25; volume 15b inside seat 22 but external to sleeve 23; volume 15c inside sleeve 23 where relief compression spring 26 is located; volume 15d adjacent openings 39; volume 15e inside valve seat 22 adjacent opening 31; and volume 15f inside plug 30 and adjacent opening 29 in guide 27.

Opening 29 is formed in one end of guide 27 to permit fluid communication between volume 15a and volume 15f. Openings 39 in the head of seat 22 permit fluid communication between volumes 15b, 15c, 15d (valve seat internal volume) and central passage 36 by way of clearance around relief poppet 24. It will also be understood that when relief poppet 24 is lifted off inner surface 32 of valve seat 22, fluid in volume 15e communicates with volume 15d. It will be further understood that when valve assembly 10 is in its nominal operating condition, such as is shown in FIG. 9, where relief poppet 24 is seated against inner surface 32, volumes 15a, 15e and 15f are at system pressure, while volumes 15b, 15c and 15d are at charge pressure (i.e., the pressure in channel 36 through its connection with charge gallery 48.

Figure 8:
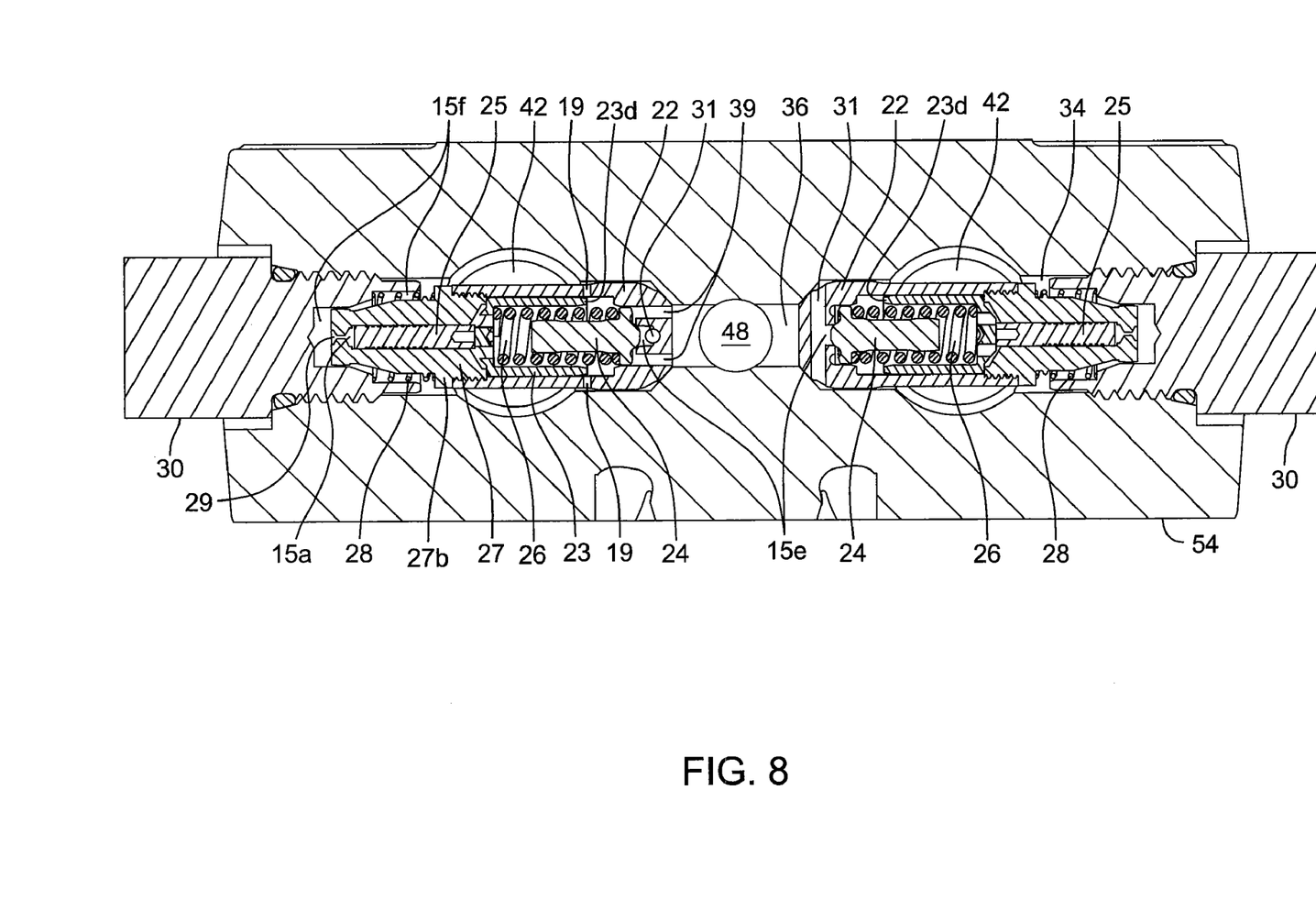
FIG. 8 is a cross-sectional view similar to that shown in FIG. 7, with the neutral valve portion of the valve assemblies in the open position.

The neutral valve function of the present invention will now be described with respect to FIGS. 8 and 9. As is known, a neutral valve operates to open the system port to the sump or reservoir when the pressure in the system port is at or near neutral, providing a wider neutral band for the component. The neutral valve function is shown in the open position in FIG. 8, where sleeve 23 is in a position where it does not block flow through cross holes 19 formed in seat 22. Thus, when system pressure in volumes 15a and 15e is sufficiently low, spring 26 acts to locate sleeve 23 in the position shown in FIG. 8, and fluid is permitted to flow from system ports 42 through cross holes 19, through the clearance around relief poppet 24, and out passages 39 to central passage 36 and charge gallery 48. As system pressure increases, piston 25 forces sleeve 23 to the right, to the position shown in FIG. 9, thus causing some compression of spring 26 and flow through cross holes 19 is stopped. During the valve's transition from open to closed positions, a tapering of the leading edge 23d of sleeve 23 produces a smooth metering effect in the flow reduction, helping to prevent abrupt starts from neutral that can translate to jerking of the hydraulic component.

In the following discussion of the pressure rise rate valve and relief valve functions of the present invention, it will be understood that FIGS. 9-12 show the condition of valve assembly 10 components when installed in end cap 54 and under the fluid conditions described below. The system loop in this description comprises system ports 42.

The pressure rise rate valve function of the present invention gives this valve the ability to quickly open when there is a rapid pressure rise in the closed hydraulic loop to permit fluid to exit the system loop, while then permitting the valve to more slowly close as the system maintains this higher pressure. Thus, by closing in a controlled manner, this valve moderates the pressure rise rate in its associated system port 42. When a valve with this capability is used in a typical application such as a lawn and garden tractor, the pressure rise rate valve softens the ride and prevents the tractor from jerking when a high acceleration force is provided by the user. Such valves are sometimes referred to as "easy ride" valves. This pressure rise rate valve feature is shown most clearly by a comparison of FIGS. 9, 10 and 11.

In FIG. 9 the system is in a typical operating condition with stable, constant fluid pressure, with volumes 15a and 15e being at system pressure. Poppet 24 remains at zero displacement, shown as position 90a.

Figure 10:
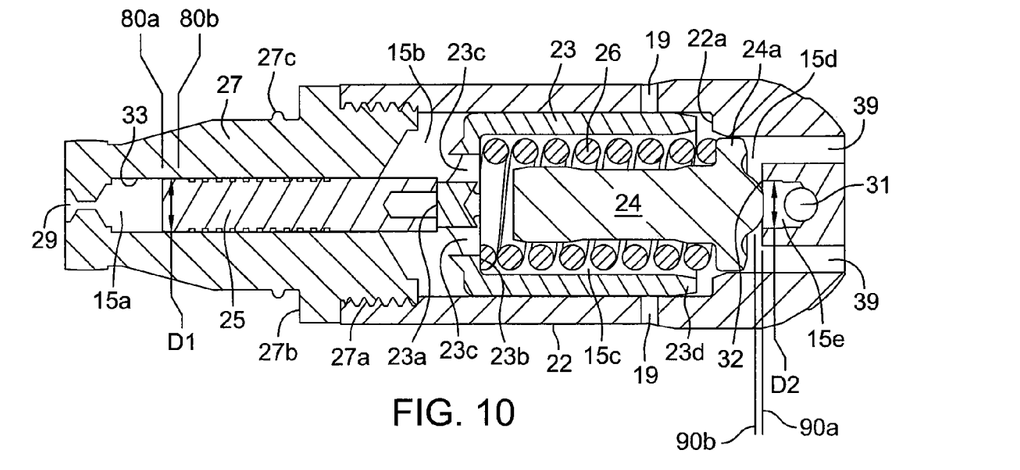
FIG. 10 is a cross-sectional view of the valve shown in FIG. 9, where the pressure rise rate valve portion of the valve assembly is in the open position.

If a rapid transition from one system pressure level to another occurs, also called a spike, the pressure increase will first appear at volume 15e and outside opening 29 (volume 15f); the rate of change of the pressure in volume 15a is delayed due to the relatively small diameter of opening 29. The increased pressure on head 24a of relief poppet 24 will tend to move relief poppet 24 to the left in FIG. 10. Given the force applied by the fluid pressure at volume 15a and the incompressibility of the fluid, movement of sleeve 23 and accumulator piston 25 towards volume 15a is resisted, resulting in the compression of relief spring 26 so that head 24a is displaced from seat 32 to position 90b from position 90a, as shown in FIG. 10. Fluid is now permitted to flow from opening 31 past relief poppet head 24a and out passages 39. The typical distance of travel of relief poppet 24 is thousandths of an inch to provide effective pressure rise rate moderation.

It will be understood that the components of valve 10 react with varying speeds depending on which component is moving and the conditions under which they are moving. For example, when relief poppet 24 moves from surface 32 of valve seat 22, it does so nearly instantaneously compared to the length of time it will then remain off surface 32, though this separation time is only on the order of tenths or hundredths of milliseconds. The period of time it takes for relief poppet 24 to return to surface 32 will be controlled in part by the volume of accumulator 15a and the cross-section of opening 29, as previously discussed.

It will also be understood that diameter D1 of the accumulator piston 25 in passage 33 is greater than diameter D2 of volume 15e against the portion of head 24A adjacent thereto. Thus, a balance of forces will exist at the point of contact between internal sleeve base 23b and the end of spring 26. At the occurrence of a pressure spike in system port 42, the pressure in volume 15a is somewhat lower than the pressure in volume 15e (and outside opening 29) resulting in a flow of fluid into volume 15a through opening 29 that is moderated by the size of opening 29. As pressure increases in volume 15a, a second assembly comprising accumulator piston 25, sleeve 23 and relief compression spring 26 is moved to the right in these figures, because the diameter D1 is greater than diameter D2, again moving relief poppet 24 against seat 32 to close off the fluid passage between a system port 42 and charge gallery 48, thus completing the pressure rise rate valve function. Thus, when the pressure in volume 15a approaches the pressure in volume 15e, the pressure acting on the greater cross-sectional area of accumulator piston 25 provides a larger force to the right in these figures than the leftward force generated in volume 15e against relief poppet head 24a, causing movement of accumulator piston 25, sleeve 23, spring 26 and relief poppet 24, if unseated, to the right.

The pressure rise rate valve function is completed when head 24a is pushed against inner seat 32 to close the relief fluid passage between a system port 42 and charge gallery 48. The length of time to closure depends in part on the initial system pressure and the differential pressure between volume 15a and volumes 15f and 15e, and the resulting amount of increased compression of spring 26.

Figure 11:
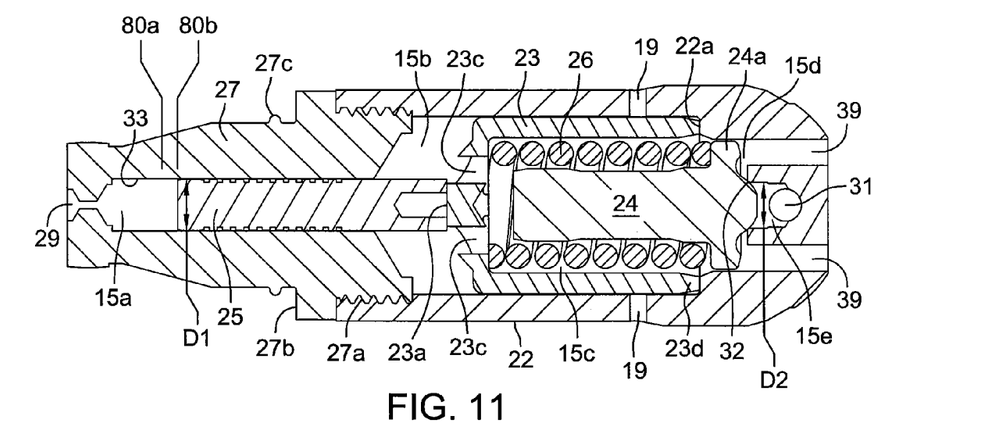
FIG. 11 is a cross-sectional view of the valve shown in FIG. 9, where the pressure rise rate valve portion of the valve assembly is in the fully closed position.
Figure 12:
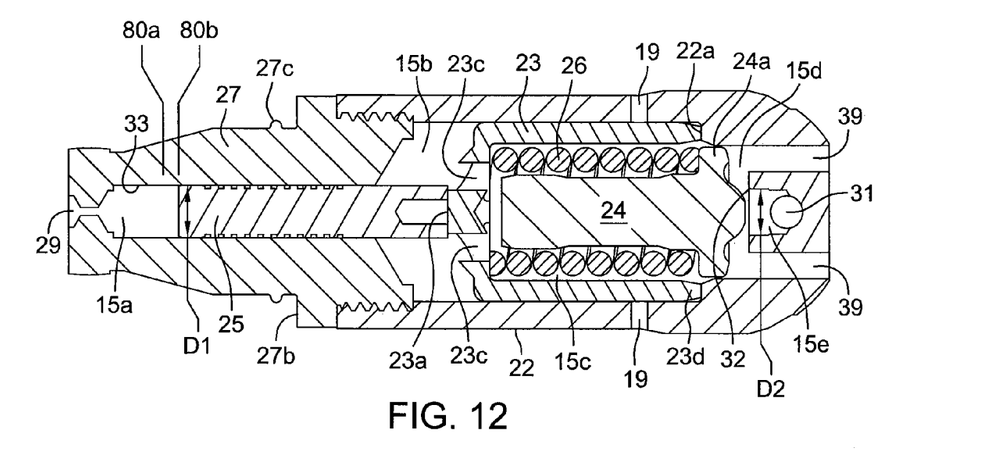
FIG. 12 is a cross-sectional view of the valve shown in FIG. 9, where the pressure rise rate valve portion of the valve assembly is in the fully closed position and the relief valve portion is open.

As system pressure continues to rise, the system pressure differential compensation action described above will ultimately cause the second assembly to reach the position shown in FIG. 11, where sleeve 23 is completely against surface 22a of seat 22. At this point, the pressure rise rate valve feature as previously described is no longer provided. As shown in FIG. 12, spring 26 can still be compressed if system pressure in volume 15e continues to rise. This increased pressure would result in relief poppet 24 compressing spring 26 and lifting off inner seat surface 32, to again permit system pressure to discharge to the charge outlet side through openings 39 (i.e., again placing volumes 15d and 15e in communication). However, since the entire inner second assembly can no longer move to the right, the valve assembly cannot close off this connection. Thus, the pressure rise rate valve feature is limited to a maximum pressure at which point valve 10 acts as a simple pressure relief valve.

While specific embodiments of the invention have been described in detail, it will be appreciated by those skilled in the art that various modifications and alternatives to those details could be developed in light of the overall teachings of the disclosure.

What is claimed is:

1. A valve apparatus for use in regulating the flow of fluid between a first fluid side and a second fluid side in a hydraulic component, comprising:

a valve seat having a head portion adapted to sealingly engage a passage in the hydraulic component between the first and second fluid sides and a body portion extending from the head portion to an opening at a second end thereof, the valve seat forming a first internal volume and having a first opening formed in the head portion to permit fluid communication between the first internal volume and the first fluid side and having at least one second opening formed in the head portion to permit fluid communication between the first internal volume and the second fluid side, the valve seat further having at least one bore formed in the body to permit fluid communication between the first internal volume and the first fluid side;

a valve sleeve slidably disposed in the first internal volume, the valve sleeve having an opening at a first end and an external base at a second end thereof, the valve sleeve forming a second internal volume and having an internal base portion with a least one opening to permit fluid to pass into and out of the second internal volume, the valve sleeve movable with respect to the bore in the body of the valve seat;

a relief poppet slidably disposed in the first internal volume, the relief poppet having a head adapted to sealingly engage the first opening in the head portion of the valve seat and having a body portion at least partially located inside the second internal volume;

a relief compression spring located inside the second internal volume and disposed around the body of the relief poppet, wherein the relief compression spring engages the head of the relief poppet and the internal base of the valve sleeve;

a valve guide attached to the second end of the valve seat, having a first end for said attachment, a second end, and an internal passage between the first and second ends, wherein the internal passage is fully open to the first end and open to the second end through a smaller diameter opening to permit fluid communication between the internal passage and the first fluid side; and an accumulator piston slidably mounted within the internal passage of the valve guide, wherein the accumulator piston cooperates with the internal passage of the valve guide to define an accumulator volume.

2. The valve apparatus of claim 1, further comprising a plurality of channel ribs located on an exterior surface of the valve seat body and at least one flow channel located between two of the channel ribs.

3. The valve apparatus of claim 1, further comprising a check compression spring disposed around the second end of the valve guide and a head surface formed on the exterior of the valve guide between the first and second ends of the valve guide, wherein the check compression spring is engaged to the head surface.

4. The valve apparatus of claim 3, further comprising a valve plug having an opening at a first end forming an internal volume sufficient to receive the check compression spring.

5. The valve apparatus of claim 4, wherein the first end of the valve plug non-sealingly engages the head surface of the valve guide at maximum compression of the check compression spring to permit fluid communication between the internal volume of the valve plug and the first fluid side.

6. The valve apparatus of claim 3, further comprising at least one rib on the second end of the valve guide to retain the check compression spring.

7. The valve apparatus of claim 1, wherein the diameter of the first opening in the valve seat head is smaller than the diameter of the accumulator piston.

8. The valve apparatus of claim 1, wherein the first end of the valve guide is attached to the second end of the valve seat by a threaded connection.

9. The valve apparatus of claim 1, further comprising a plurality of annular ribs located on the accumulator piston.

10. The valve apparatus of claim 1, wherein the first end of the valve sleeve is tapered.

11. A valve apparatus for use in controlling the flow of fluid between the closed hydraulic loop and the fluid source of a hydraulic component, comprising:

a valve seat movable between a first open position to permit fluid to flow from the fluid source to the closed hydraulic loop when the pressure in the closed hydraulic loop is lower than a first predetermined pressure level and a second closed position when the pressure in the closed hydraulic loop is equal to or greater than the first predetermined pressure level;

a sleeve member located in the valve seat and movable between a first position where the valve apparatus is open to permit fluid communication between the closed hydraulic loop and the fluid source when the pressure in the closed hydraulic loop is below a second predetermined pressure level and a second position where the sleeve member prevents fluid communication between the closed hydraulic loop and the fluid source;

a movable poppet, cooperating with the valve seat and the sleeve member to provide a pressure rise rate function whereby the poppet opens for a limited time when the pressure in the closed hydraulic loop exceeds a third predetermined level and increases at a rate exceeding a predetermined rate and closes in a controlled manner; and whereby the poppet will open to permit fluid to flow from the closed hydraulic loop to the fluid source when the pressure in the closed hydraulic loop exceeds a fourth predetermined level.

12. A valve apparatus for use in regulating the flow of fluid between a first fluid side and a second fluid side in a hydraulic component, comprising:

a valve seat movable between an open position to permit fluid flow from the second fluid side to the first fluid side when the pressure in the first fluid side is lower than the pressure in the second fluid side by a predetermined amount and a closed position;

a valve sleeve slidably disposed in the valve seat and movable between a first position to permit fluid communication between the two fluid sides when the pressure in the first fluid side is below a first predetermined level and a second position where the valve sleeve does not permit fluid communication between the two fluid sides when the pressure in the first fluid side is equal to or greater than the first predetermined level;

a relief poppet slidably disposed in the valve seat and movable between a relief open position when the pressure in the first fluid side exceeds a second predetermined level and increases at a rate exceeding a predetermined rate and a relief closed position, and wherein the relief poppet remains in the relief open position when the pressure in the first fluid side exceeds a third predetermined level.

13. The valve apparatus of claim 12, further comprising a check compression spring.

14. The valve apparatus of claim 12, wherein the valve sleeve is engaged to the valve seat when the pressure in the first fluid side exceeds the third predetermined level.

15. A valve apparatus for use in regulating the flow of fluid between a closed hydraulic loop and a fluid source in a hydraulic circuit, comprising:

a valve seat for selectively opening and closing fluid communication between the closed hydraulic loop and the fluid source, the valve seat comprising a head portion, a body forming a first internal volume, a first opening formed in the head portion to permit fluid communication between the closed hydraulic loop and the first internal volume and at least one second opening in the head portion to permit fluid communication between the fluid source and the first internal volume;

a slidable member located in the first internal volume, the slidable member comprising a first end adapted to engage the valve seat head, a base formed at a second end, at least one opening formed in the base, and a second internal volume formed between the first and second ends of the slidable member;

a relief poppet slidably disposed in the first internal volume, the relief poppet comprising a head adapted to sealingly engage the first opening in the head portion of the valve seat and a body extending from the relief poppet head and at least partially located inside the second internal volume;

a relief compression spring located inside the second internal volume and positioned between the relief poppet and the base of the slidable member;

a valve guide comprising a first end attached to the valve seat, a second end, an opening formed in the second end and in fluid communication with the closed hydraulic loop, and an internal passage between the first end and the opening, wherein the diameter of the opening is less than the diameter of the internal passage; and an accumulator piston slidably mounted within the internal passage of the valve guide, wherein the accumulator piston cooperates with the internal passage of the valve guide to define an accumulator volume.

16. The valve apparatus of claim 15, further comprising at least one bore formed in the body of the valve seat to permit fluid communication between the closed hydraulic loop and the first internal volume of the valve seat, and said bore is opened and closed by the position of the slidable member.

17. The valve apparatus of claim 15, wherein the first end of the slidable member is tapered.

18. The valve apparatus of claim 15, further comprising a plurality of channel ribs formed on the exterior surface of the valve seat body and at least one flow channel bounded by two of the channel ribs.

19. The valve apparatus of claim 15, further comprising a check compression spring engaged to the valve guide.

20. The valve apparatus of claim 19, further comprising a head surface formed on the exterior of the valve guide and engaged to the check compression spring.

21. The valve apparatus of claim 19, further comprising at least one rib on the second end of the valve guide to retain the check compression spring.

22. The valve apparatus of claim 19, further comprising a valve plug having an internal volume sufficient to receive the check compression spring.

23. The valve apparatus of claim 22, wherein the valve plug non-sealingly engages the head surface of the valve guide at maximum compression of the check compression spring to permit fluid communication between the internal volume of the valve plug and the closed hydraulic loop.

24. The valve apparatus of claim 15, wherein the diameter of the first opening in the valve seat head is smaller than the diameter of the accumulator piston.

25. The valve apparatus of claim 15, wherein the first end of the valve guide is attached to a second end of the valve seat by a threaded connection.

26. The valve apparatus of claim 15, further comprising a plurality of annular ribs on the accumulator piston.

27. A valve for use between a hydraulic circuit and a fluid source in a hydraulic apparatus, the valve comprising:

a check means for opening the valve to permit fluid to pass from the fluid source into the hydraulic circuit when the pressure in the hydraulic circuit is below the pressure in the fluid source by a first predetermined amount;

a relief valve means formed with the check means for opening the hydraulic circuit to the fluid source when the pressure in the hydraulic circuit exceeds a first predetermined pressure level; and pressure rise rate means for temporarily opening the hydraulic circuit to the fluid source when the pressure in the hydraulic circuit exceeds a second predetermined pressure level, and increases at a rate exceeding a predetermined rate and for then closing the hydraulic circuit from the fluid source in a controlled manner.

28. The valve of claim 27, further comprising a neutral valve means for opening the hydraulic circuit to the fluid source when the pressure in the hydraulic circuit is below a third predetermined pressure level, wherein the neutral valve means is formed in the same valve assembly as the check means, and the first predetermined pressure level is higher than the third predetermined pressure level.

* * * * *